US007805210B2

(12) United States Patent
Cucos et al.

(10) Patent No.: US 7,805,210 B2
(45) Date of Patent: Sep. 28, 2010

(54) SYNCHRONIZING MULTI-CHANNEL SPEAKERS OVER A NETWORK (75) Inventors: Alex Cucos, Galway (IE); Peter Corcoran, Galway (IE)

(73) Assignee: National University of Ireland, Galway, Galway (IE)

( * ) Notice: Subject to any disclaimer, the term of this patent is extended or adjusted under 35 U.S.C. 154(b) by 809 days.

(21) Appl. No.: 11/667,585

(22) PCT Filed: Nov. 10, 2005

(86) PCT No.: PCT/EP2005/012196

§ 371 (c)(1),
(2), (4) Date: May 11, 2007

(87) PCT Pub. No.: WO2006/053704

PCT Pub. Date: May 26, 2006

(65) Prior Publication Data

US 2007/0297459 A1 Dec. 27, 2007

(30) Foreign Application Priority Data

Nov. 18, 2004 (IE) ............................... S2004/0770

(51) Int. Cl.
*G06F 17/00* (2006.01)
(52) U.S. Cl. ...................................................... 700/94
(58) Field of Classification Search .................. 700/94; 715/202, 203, 500.1, 723, 808
See application file for complete search history.

(56) References Cited

U.S. PATENT DOCUMENTS

| 5,655,144 | A | * | 8/1997 | Milne et al. .................. 715/202 |
| 5,832,024 | A | * | 11/1998 | Schotz et al. ................ 375/134 |
| 6,252,919 | B1 | | 6/2001 | Lin |
| 6,327,274 | B1 | | 12/2001 | Ravikanth |
| 6,466,832 | B1 | * | 10/2002 | Zuqert et al. ................... 700/94 |
| 7,324,857 | B2 | * | 1/2008 | Goddard ....................... 700/94 |
| 7,512,319 | B2 | * | 3/2009 | Miyaki et al. .................. 386/84 |
| 7,539,889 | B2 | * | 5/2009 | Celinski et al. ............. 713/400 |
| 7,657,829 | B2 | * | 2/2010 | Panabaker et al. ........... 715/203 |
| 2003/0200001 | A1 | | 10/2003 | Goddard |
| 2003/0210796 | A1 | | 11/2003 | McCarty et al. |
| 2004/0059446 | A1 | | 3/2004 | Goldberg et al. |

FOREIGN PATENT DOCUMENTS

CA 2 199 647 C 1/2004

OTHER PUBLICATIONS

International Search Report dated Feb. 23, 2006, including PCT/ISA/220 and PCT/ISA/237 (Twelve (12) pages).

* cited by examiner

*Primary Examiner*—Andrew C Flanders
(74) *Attorney, Agent, or Firm*—Crowell & Moring LLP (57) ABSTRACT A server is arranged to distribute at least one stream of audio data corresponding to an audio signal to two or more speakers across a network. Each speaker includes a respective clock for regenerating the audio signal from the audio data. For each speaker, the server determines a relative rate of the speaker clock to a real time rate; and for each stream of data provided to a speaker, the server determines from a respective relative rate, respective samples of the audio signal to be altered in accordance with said relative rate. The streams are altered accordingly and transmitted across the network.

10 Claims, 5 Drawing Sheets

*Fig 1:* The Emerging Home Network Infrastructure for CE Appliances.

SYNCHRONIZING MULTI-CHANNEL SPEAKERS OVER A NETWORK

CROSS-REFERENCE TO RELATED APPLICATIONS

This application is a National Phase of PCT International Application No. PCT/EP2005/012196, filed Nov. 10, 2005, which claims priority under 35 U.S.C. §119 to Irish Application No. S2004/0770, filed Nov. 18, 2004, the entire disclosures of which are expressly incorporated by reference herein.

FIELD OF THE INVENTION

The present invention relates to the field of synchronizing multi-channel speakers over a network. Such speakers can be incorporated in networked consumer appliances which can produce and consume digital audio/video data.

BACKGROUND ART

The Haas Effect, also known as the precedence effect, describes the human psycho-acoustic phenomenon of correctly identifying the direction of a sound source heard in both ears but arriving at different times. Due to the head's geometry the direct sound from any source first enters the ear closest to the source, then the ear farthest away. The Haas Effect tells us that humans localize a sound source based upon the first arriving sound, if the subsequent arrivals are within 25-35 milliseconds. If the later arrivals are longer than this, then two distinct sounds are heard.

The Haas effect can produce an apparent increase in the volume from one of a pair of stereo speakers. In a high quality Hi-Fi system, this effect can be perceived at time differences of only 1-2 mS between the two stereo channels, becoming increasingly noticeable up to 25 mS or so. Greater time lags will be perceived as echoes and reverberations. The necessity to synchronize time between networked multi-channel speakers should therefore be clear.

US patent application 2003/0200001 describes a method for synchronizing the playback of a digital audio broadcast on a plurality of network output devices using a microphone near a source, embedded control codes, and the audio patterns from the network output devices. An optional, additional manual adjustment method relies on a graphical user interface for adjustment and audible pulses from the devices which are to be synchronized. Synchronization of the audio is accomplished with clock synchronization of the network output devices.

US patent application 20040059446 to Goldberg et al discloses synchronizing remote audio devices that are coupled together with a bus. The synchronization mechanism compares a signal on the bus with a clock signal on the audio device and adjusts the clock in response to the comparison. This allows the synchronization mechanism to accurately synchronize remote audio devices without requiring high precision clocks or other complicated solutions. The synchronization technique is particularly applicable to synchronizing remote audio devices in a distributed audio system that digitally samples and broadcasts for communication purposes. In Goldberg, the synchronization mechanism improves audio quality by synchronizing the sampling and outputting of each audio device on the bus. This improves audio quality by reducing the distortion that occurs as a result of varying sample times. This provides much more precise audio synchronization but requires a wired bus. Thus it is not suitable for implementation between two wireless networked speakers.

In the home networking market, a major catalyst is the recent emergence of 802.11 WLAN technology for wireless home networking. The cost of 802.11g access points is rapidly falling below 100 Euro which will further drive the market for networked CE products as consumers begin to perceive the benefits and simplicity of these new wireless networking technologies.

Figure 1:
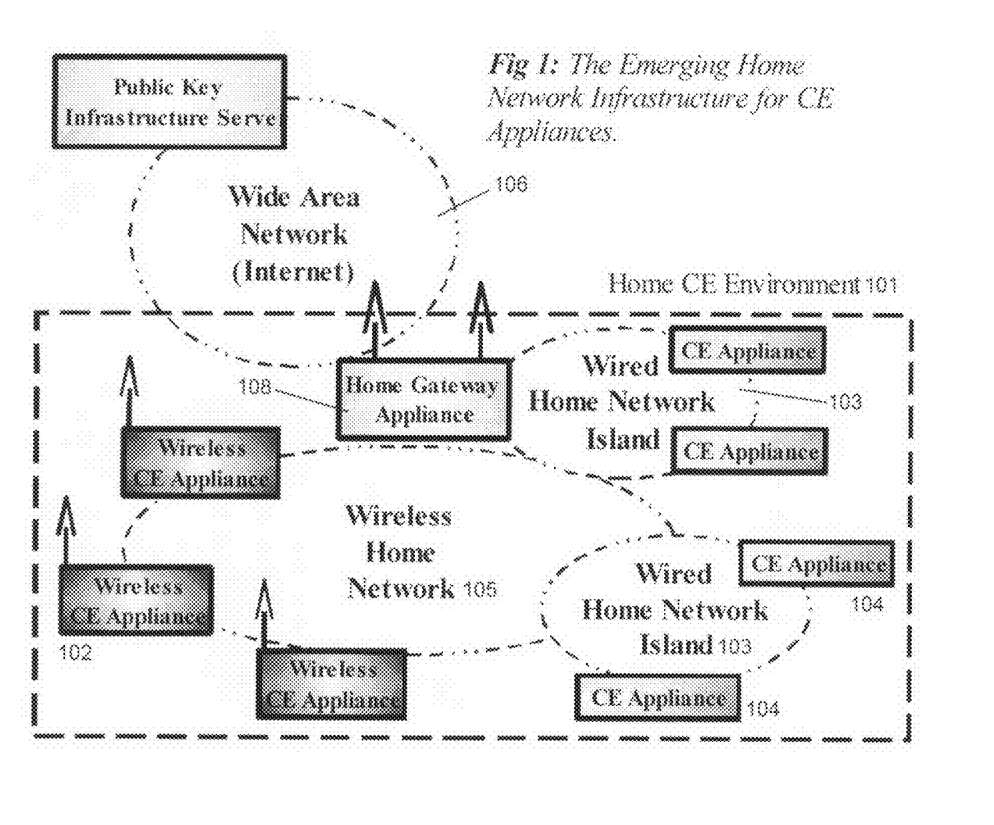
FIG. 1 shows a Home Network Infrastructure for CE Appliances.

In FIG. 1 we show the home networking environment [101] that next-generation CE appliances [102, 104] will "live" in. Basically a local network of CE appliances will interoperate over wired islands [103] which are glued together by a global wireless 802.11 network [105]. This local network is connected, in turn, via a gateway appliance [108] to an external wide area network (WAN) [106], effectively the broadband connection to the home.

Accordingly, consumers will expect state-of-art home CE devices to be wireless networked enabled so they can install new devices and peripheral subsystems without a requirement for wires or cables.

Wireless speakers are already known in the market but these are not true networked subsystems, but typically carry an audio signal from a master unit over a wired point-to-point connection. Thus, synchronization of the audio can be achieved on the master unit.

US patent application no. 2003/0210796 to McCarty et al discloses communicating audio signals between an input device and an output device via a network. The output device can include loudspeakers and headphones. In some embodiments an output device, for example a center channel speaker, transmits audio signals to other output devices. In some embodiments, the output device is coupled to, or combined with, a speaker stand or speaker bracket. The network can be wireless, wired, infrared, RF, and powerline. However McCarty et al do not explicitly disclose achieving high quality audio synchronization between stereo speakers. (They do mention that manual synchronization may be achieved by adjusting phase or delay between channels; however this cannot compensate for very fine time delays between channels or for ongoing drift between the two channels.)

A related field of prior art is that of determining the clock skew of an audio subsystem. Examples include "*A New Audio Skew Detection and Correction Algorithm*" to Akester et al, presented at ICME 2002 which teaches accurately estimating the clock skew based on time-stamped RTP packets and a determination of the audio playback rate from system interrupts. U.S. Pat. No. 6,327,274 to Ravikanth discloses determining relative clock skews between two devices connected to a packet based data network.

It is evident from the prior art that each device may determine a local clock skew rate and may modify the received multimedia stream accordingly. However, in such cases, the client device must:

(i) perform real-time interrupt-driven analysis in order to measure real-time clock skew;

(ii) at the same time it must decode the digital audio and may also need to de-interleave the received audio stream; and finally, (iii) in order to increase, or decrease the size of a received audio data packet to compensate for the determined clock skew the client device should perform an analysis of each received audio packet in order to determine where, and how, to insert (or remove) audio samples.

All of these methods must be further implemented in real-time placing a high computational load on the client device.

Step (i) above can be realized using techniques such as those described U.S. Pat. No. 6,327,274 to Ravikanth where the relative clock skew between the server originating the data stream and each client may be determined, on the client, from the timestamp data on each RTP packet and a statistical analysis of the jitter and delay of a plurality of packets from the received data stream. However, this still places significant real-time computational demands on the client device.

SUMMARY OF THE INVENTION

The present invention provides a method operable in a server arranged to distribute at least one stream of audio data corresponding to an audio signal to two or more speakers across a network, each speaker including a respective clock for re-generating said audio signal from said audio data, said method comprising the steps of:

for each speaker, determining a relative rate of said speaker clock to a real time rate;

for each stream of data provided to a speaker, determining from a respective relative rate, respective samples of said audio signal to be altered in accordance with said relative rate;

altering said streams in accordance with said determining step; and transmitting said altered audio streams across said network.

Preferably, the altering step comprises:

amending each stream by adding, deleting or duplicating said determined samples.

Alternatively, the altering step comprises:

including in respective audio streams, indications of audio samples which are to added, deleted or duplicated during re-generation of said audio signal in a speaker.

The present invention allows for compensation for clock skew where at least one multimedia stream is to be broadcast to two or more networked client devices.

Using the present invention, much of the real-time computing requirements for a plurality of client devices can be shifted to a single, more powerful server device.

In preferred embodiments, all devices are time synchronized using NTP (Network Time Protocol).

In preferred embodiments, said relative rates are determined using RTCP (Real-Time Control Protocol).

Other objects, advantages and novel features of the present invention will become apparent from the following detailed description of the invention when considered in conjunction with the accompanying drawings.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENT(S)

Preferred embodiments of the present invention provide the ability to achieve sub-millisecond synchronization between the two or more audio channels thus mitigating the potential for psycho-acoustic distortion of the stereo sound through the Haas effect.

Figure 2A:
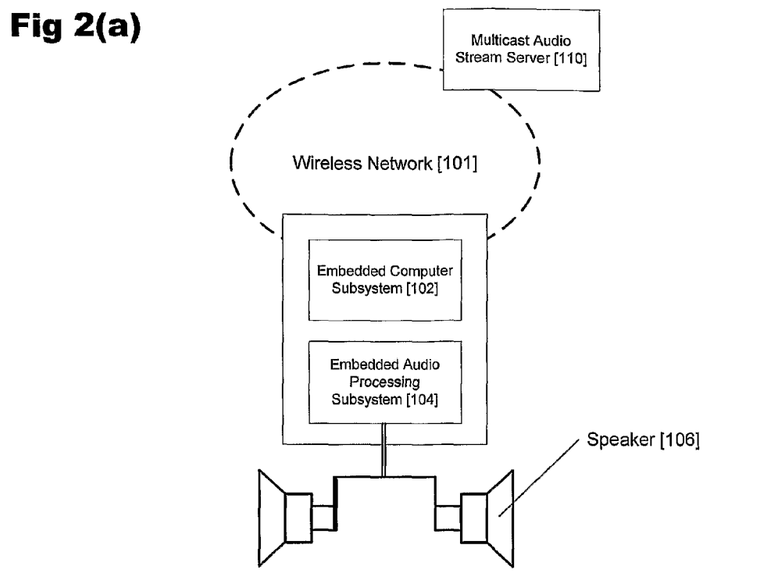
FIG. 2(a) shows a prior art wireless digital audio subsystem.
Figure 2B:
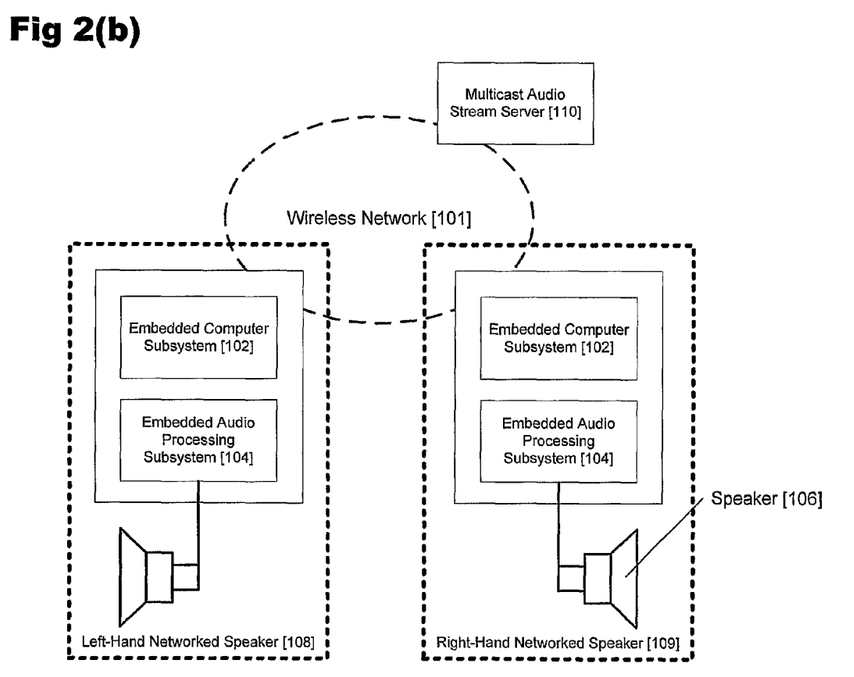
FIG. 2(b) shows a wireless digital audio subsystem according to an embodiment of the present invention.

A preferred embodiment of the invention is illustrated in FIG. 2(b). In this embodiment, audio synchronization is described in term of a stereo audio system with two networked speakers. However the same techniques can be equally applied to 5.1 and other multi-speaker systems. It will also be apparent that similar techniques may be applied to a video playback device. Hence, the system may also be employed to synchronize multiple audio channels with a video channel.

In the preferred embodiment, each speaker 108,109 includes an embedded computer subsystem 102 and an audio subsystem 104. In essence the embedded computer subsystem 102 receives, decodes and writes blocks of raw audio data into a buffer and these are processed and rendered as analog audio by the audio sub-system 104.

In the preferred embodiment a multicast stereo audio stream is broadcast from a third networked device, a multimedia stream server 110. The broadcast data will normally be sent using the Real-Time Protocol (RTP) which is described in RFC 3550 & 3551 and RTCP (Real-Time Control Protocol) described in RFC 3605. Normally RTP will carry the main data payload and RTCP is the control protocol which manages packet re-transmission and other stream control activities. In certain embodiments the audio data stream carried in the RTP packets may be interleaved by the server 110 so that the loss of a data packet will not cause a single large gap in the rendered audio output at the clients 108,109. Such techniques are well known to those skilled in the art.

It is a straightforward matter to modify such a multicast stereo audio stream to include a start-time marker which will allow the RH and LH speaker subsystems of FIG. 2(b) to begin playing their respective stereo channels simultaneously.

In this regard, each sub-system 102 employs the Network Time Protocol (http://www.ntp.org) to achieve clock synchronization. In normal operation, it is quite practical to achieve synchronization between two embedded computers of the order of <1 mS.

More precise timing can be achieved by employing a precise PPS (One Pulse Per Second) hardware signal which can be implemented using a GPS receiver such as the Motorola Oncore GPS unit. Alternatively a master PPS signal may be generated locally using RF or IR signals and used to synchronize multiple slave devices. Where a PPS hardware signal is available, use of NTP can achieve synchronization between computers of the order of 50-100 μS and even more precise synchronization is possible using techniques described in:

http://www.eecis.udel.edu/mills/database/brief/precise/precise.pdf.

Thus, we can understand that the embedded computer subsystems [102] of the LH-speaker system [108] and the RH-speaker system [109] illustrated in FIG. 2(b) can be synchronized to a very high accuracy.

In normal operation, the audio subsystem [104] generates output sound data at a fixed rate which is dependent on an internal clock signal. As this signal is generated from some form of electronic oscillator, it is subject to a variety of factors including manufacturing variations and environmental factors such as temperature. Thus, it is highly unlikely that two audio subsystems will be exactly matched. This is not a problem in prior art systems such as is illustrated in FIG. 2(a) because both speakers are driven from a single audio subsystem.

However, even if the sub-systems 102 of two networked speakers illustrated in FIG. 2(b) were resynchronized at the start of every music track as previously described—say every 3 minutes—a drift of 0.01% or 1 in 10,000 between the two stereo channels will produce an inter-channel delay of 18 mS which is more than sufficient to produce a significant Haas effect and almost sufficient to induce reverberations and echo.

Therefore, as well as synchronizing the sub-systems 102, the audio processing subsystems 104 of each stereo subsystem will also need to be synchronized in order to compensate for clock skew between them or the stereo channels will slowly lose their initial synchronization.

Figure 3:
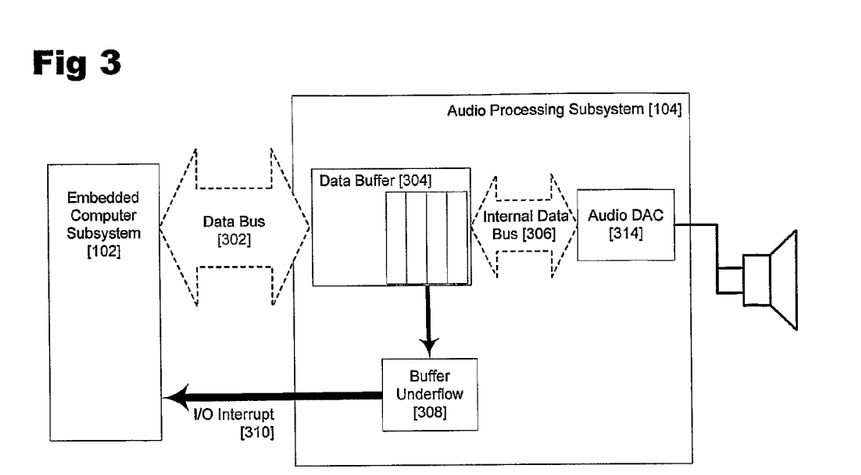
FIG. 3 shows the subsystem of FIG. 2(b) in more detail.

FIG. 3 illustrates the interface between the embedded computer subsystem [102] and the audio subsystem [104]. As indicated above, the embedded computer subsystem writes blocks of raw audio data, e.g. PCM or ADPCM, via a parallel data bus [302] into a buffer [304] and these are processed and rendered as analog audio by a digital-to-analog convertor [314]. When the data buffer [304] begins to empty, an interrupt [310] is transmitted to the embedded computer subsystem indicating that more data will be required shortly in order to maintain the continuity of the output analog signal. Note that in the preferred embodiment the audio subsystem is a conventional PC sound card.

From the prior art it is well known that the local clock skew of the audio subsystem on each networked client can be determined. Techniques are also described in the prior art where clock synchronization must be achieved between a first networked device originating a real-time audio stream transferred over a packet network, and a second networked device where said stream is rendered for playback, for example, as described in PCT Application No. PCT/EP2004/006808. In this case, clock skew correction is applied in the field of VoIP or point-to-point communications. In such applications, a sender device connects to a previously unknown device and predetermined knowledge regarding the clock skew of such a device is generally not available and thus must be determined dynamically.

In the preferred embodiment, because the server 110 is connected to clients 108,109 which are in general known and behave relatively consistently, local clock skew measurement need only be performed occasionally, typically when the client device is otherwise inactive. The results of such occasional measurements are communicated back to the server 110 where they are statistically analyzed to determine a long term clock skew rate which will be applied to the communicating client device. These clock skew measurements may be initiated by the server and a more intensive calibration regime may be applied when a device is initially connected to the network until the server has determined a reliable clock skew rate for each client device. It will be evident to those skilled in the art that certain of the methods and techniques employed by NTP may be advantageously adapted for this purpose.

When the server 110 is requested to initiate a new audio stream it needs to prepare audio data for streaming. As will be known to those skilled in the art the raw digital audio data may be pre-encoded, or if this is not the case it will be passed through a codec which may be implemented as a hardware subsystem, or a software subsystem or some combination thereof. The encoded stream data is next packetized and this process may also incorporate an interleaving step wherein the data from a single timeslot is spread over several packets. This minimizes the effects of packet loss on the audio stream rendered at the client. The precise implementation of each of these steps of encoding, packetization and interleaving will depend on the format of the digital data stream. Typically a digital audio format will be optimized to facilitate packet de-interleaving, stream re-assembly and stream decoding.

In the preferred embodiment, an additional step is now added to this chain of server-side processes. By employing the predetermined clock skew rates, this step performs additional stream processing to adjust the audio data for each client device. The precise implementation of said stream processing is, to some extent, dependent on the underlying digital stream format. However we can identify two generalized techniques of stream processing in the preferred embodiment:

where the underlying digital format supports asymmetric channels, i.e. the left and right channels of the multicast stream are not required to have an identical number of bytes of data, then an appropriate number of redundant audio samples are either removed; added to; or duplicated within one or both of the audio channels; alternatively, (i) where the underlying digital format requires symmetric channels then said redundant audio samples which should be added to (or removed from) the stream data for one or both channels must be marked separately from the stream data and this information is conveyed to the client.

(ii) Hereafter we refer to method (i) as "stripping" (bearing in mind that samples may indeed be added or duplicated) and method (ii) as "marking".

(iii) Various techniques for determining redundant audio samples within a block of audio data will be known to those skilled in the art of audio signal processing. The simplest form of redundant audio sample will occur during "silent" periods in an audio track. In the context of the present invention these silent periods need only last for a timeframe of the order of an audio sample in order to be useful.

Figure 4:
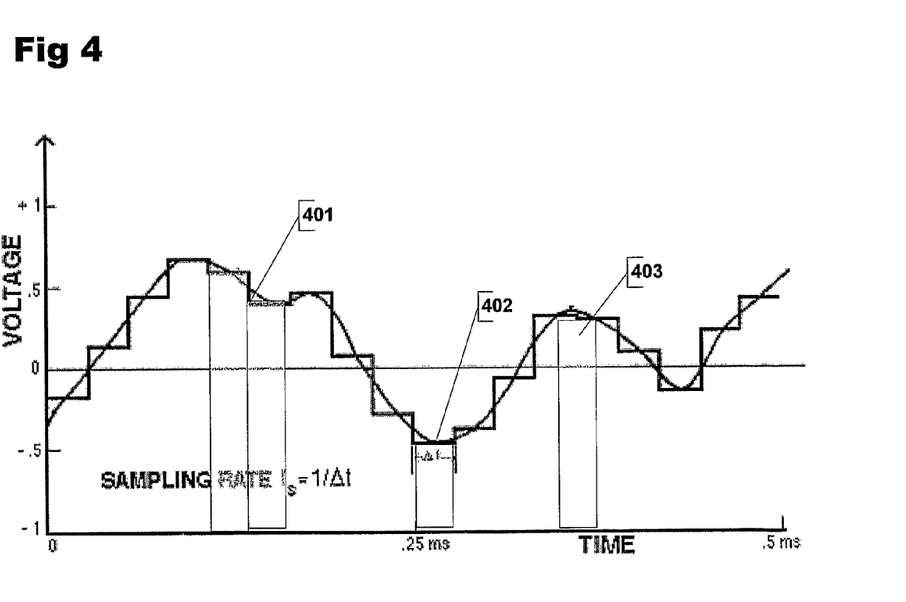
FIG. 4 shows where redundant samples can be inserted and deleted in an audio stream.

In FIG. 4 we illustrate several additional simplified examples indicating where redundant samples can be inserted, duplicated or deleted in an audio stream. These occur: in regions where the audio signal is changing relatively slowly and changing one or more samples will not significantly alter the local slope of the audio signal [401]; at maxima and minima of the audio signal [402]; and in some instances two audio samples may be averaged and replaced by a single sample with their average value [403]. Other, more complex analysis techniques may be applied where a particularly complex audio signal does not have many easily determined redundant samples.

Figure 5A:
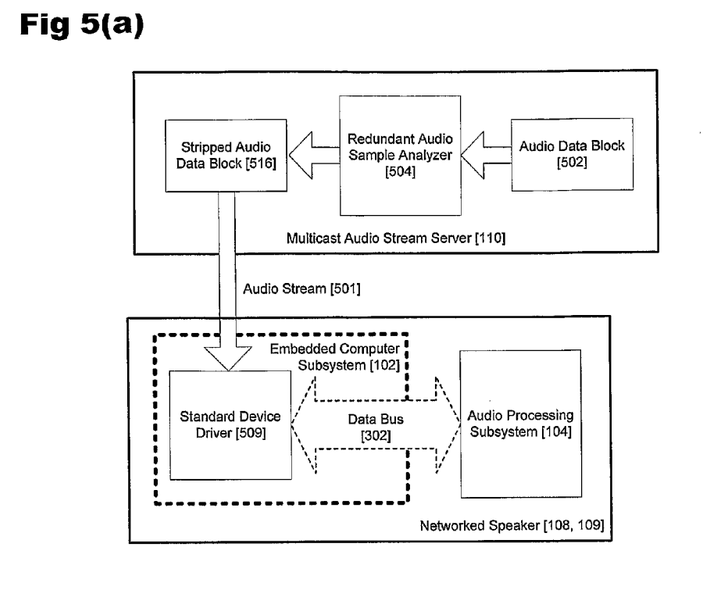
FIGS. 5(a) and (b) illustrate respective embodiments of the present invention in more detail.

Now the preferred method of stream processing in a simple embodiment of the present invention is method (i) as it allows all of the stream processing to be achieved on the server side and, in turn, does not require any client side modifications. This embodiment is illustrated in FIG. 5(a). For clarity the steps of encoding, packetization and interleaving are omitted. Thus, according to method (i) an audio data block [502] is analyzed by a redundant audio sample analyzer [504] which determines, based on the clock skew of the receiving device which, and how many, redundant audio samples need to be removed from/added to the digital audio block in order to achieve clock skew compensation for the receiving device. Note that multiple such "stripping" operations will occur in parallel for each audio stream with a different intended recipient. This process generates a stripped audio data block [516] which may be optionally encoded prior to being packetized and broadcast within an audio stream [501]. In this embodiment, as the required clock skew compensation has been entirely performed on the server no modifications are required on the client devices.

However, as will next be disclosed, there are disadvantages to this method, particularly for multi-room embodiments of the present invention. Thus method (ii), although being more complex to implement and requiring combined client-server processing can have significant advantages over method (i).

Figure 6:
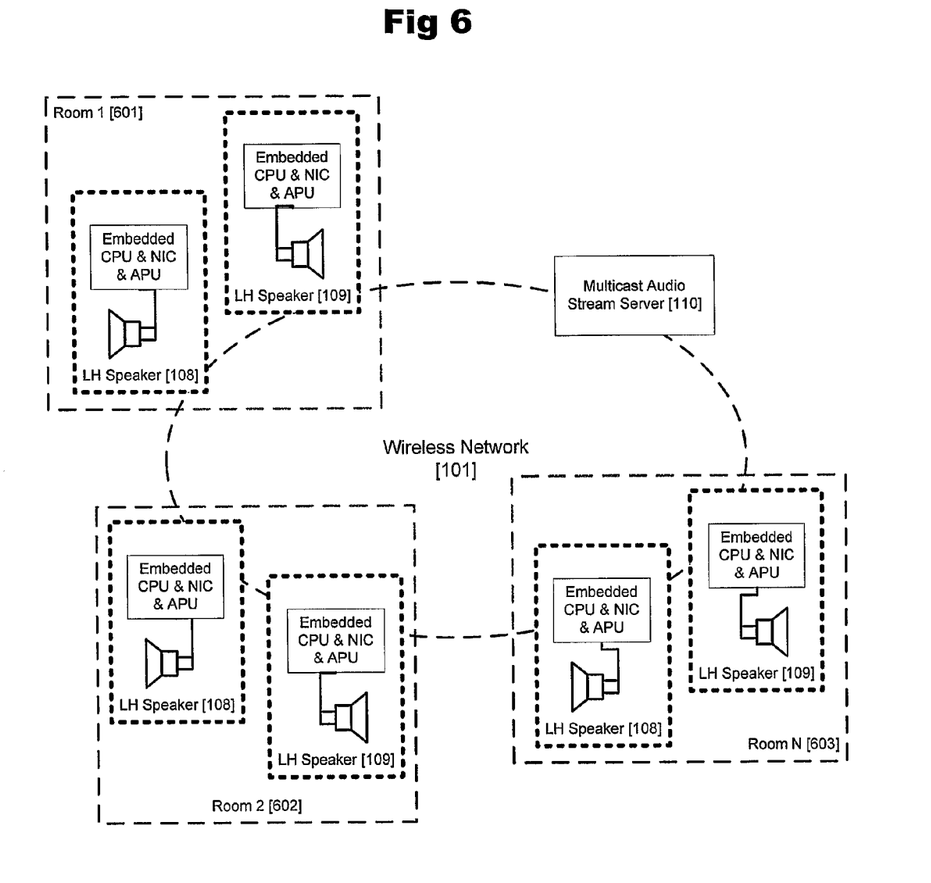
FIG. 6 shows a multi-room embodiment of the invention.

For example, the present invention can be simply extended to a multi-room embodiment as illustrated in FIG. 6. Thus multiple stereo speaker pairs in different rooms of a house can simultaneously render the same audio data, each stereo speaker pair being locally synchronized within a room, and globally synchronized with the speaker pairs in other rooms of the house. Each speaker pair obtains the audio data from the same multicast data stream [511] so that network bandwidth requirements are optimized. Evidently the "stripping" method of audio channel synchronization will not be suitable for such a multi-room system. Instead the server must obtain clock skew rates for each networked speaker and provide a "marked" list of redundant audio samples customized for each speaker. Typically there will be overlap between said "marked" lists and this data may be optionally organized in a set of difference tables to reduce network bandwidth requirements.

Figure 5B:
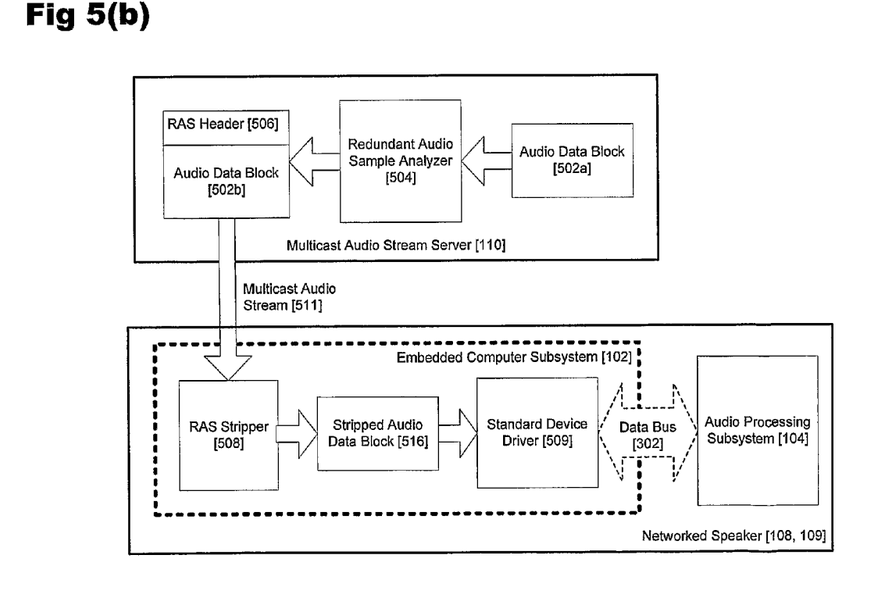

The operation of this embodiment is illustrated for a single client in FIG. 5(b). An audio data block [502a] is analyzed as before by a redundant audio sample analyzer [504] which determines, based on the clock skew of the receiving device which, and how many, redundant audio samples need to be removed from the digital audio block, for each receiving client device, in order to achieve clock skew compensation for the receiving device. In this embodiment these samples cannot be simply stripped from the audio stream as each client device will have a unique clock skew and require a different set of samples to be stripped. Accordingly the stripping operation must be performed separately on each client and the required "marking" data for each client is recorded within an RAS (Redundant Audio Sample) Header [506] or equivalent. The original audio data block remains in an unaltered form [502b]. This audio data is next packetized into a multicast stream [501] which can be received by a plurality of networked client devices [108,109].

When an audio data block (or payload) is received at the client the relevant list of "marked" audio samples is extracted or reconstructed, as appropriate, from the RAS Header [506] by an RAS stripper [508], which may be implemented in either hardware or software or some combination thereof. The RAS stripper [508] then determines from said list if audio samples should be inserted or removed at the "marked" locations. In this embodiment, samples are either removed or simply duplicated, as appropriate. This has the advantage that only the location of a redundant audio sample needs to be recorded in the RAS header [506]. The resulting stripped audio data block [516] is next passed to the standard device driver for the audio subsystem [509] and written over the data bus [302] into the audio processing subsystem [104].

Those skilled in the art will realize that digital media streams are rarely streamed in a raw sampled format. Typically the raw digital media stream will be encoded, and may optionally be compressed and encrypted. We remark that for certain encoding schemes it may be advantageous to incorporate the server-side "marking" and client-side "stripping" operations into the server-side encoding engine and the client-side decoding engine.

Advanced encoding schemes may also incorporate multi-stream synchronization mechanisms for 5.1 format audio. These mechanisms are intended to allow multiple variable bit-rate audio streams to be resynchronized after decoding. However, where they offer advantageous mechanisms for adjusting the relative size of the reconstructed data streams, they may be advantageously employed in an alternative embodiment of the present invention.

As was discussed above, environmental factors, particularly temperature may affect the drift between channels. In further development, the temperature within the audio subsystem of a client may be additionally measured when clock skew calibration is performed and this data may be supplied to the server for statistical analysis. In this way the server may not only determine the underlying clock skew rate of a particular client, but it may also correlate the clock skew rate with temperature variations.

In this case, the server may request temperature measurements from each client, prior to initiating a multicast stream, in order to take the current temperature of each into account when stripping or marking the audio streams.

All of the above-mentioned references are herein incorporated by reference in their entirety to the same extent as if each individual reference was specifically and individually indicated to be incorporated herein by reference in its entirety.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method operable in a server arranged to distribute at least one stream of audio data corresponding to an audio signal to two or more speakers across a network, each speaker including a respective clock for re-generating said audio signal from said audio data, said method comprising the steps of:

for each speaker, determining a relative rate of said speaker clock to a real time rate;

for each stream of data provided to a speaker, determining from a respective relative rate, respective samples of said audio signal to be altered in accordance with said relative rate;

altering said streams in accordance with said determining step; and transmitting said altered audio streams across said network.

2. A method according to claim 1 wherein the altering step comprises amending each stream by adding, deleting or duplicating said determined samples.

3. A method according to claim 1 wherein the altering step comprises including in respective audio streams, indications of audio samples which are to be added, deleted or duplicated during re-generation of said audio signal in a speaker.

4. A method according to claim 3 wherein said indications are included in headers of packets including audio sample data.

5. A method according to claim 1 in which altering said streams comprises one or more of:

adding or removing one or more samples from a silent period of said audio signal;

adding or removing one or more samples from a slowly changing period of said audio signal; and averaging two more samples to provide fewer samples for a period of said audio signal.

6. A method according to claim 1 further comprising synchronizing said speakers in real-time using NTP (Network Time Protocol).

7. A method according to claim 1 wherein said determining comprises determining said relative rates using RTCP (Real-Time Control Protocol).

8. A method according to claim 1 further comprising the step of periodically sensing an ambient temperature and determining said relative rate according to said ambient temperature.

9. A server arranged to distribute at least one stream of audio data corresponding to an audio signal to two or more speakers across a network, each speaker including a respective clock for re-generating said audio signal from said audio data, said server being arranged:
- for each speaker, to determine a relative rate of said speaker clock to a real time rate;
- for each stream of data provided to a speaker, to determine from a respective relative rate, respective samples of said audio signal to be altered in accordance with said relative rate;
- to alter said streams in accordance with said determining step; and
- to transmit said altered audio streams across said network.

10. A server according to claim 9 arranged to transmit said altered audio streams data across a wireless network.

* * * * *